United States Patent
Wang

(10) Patent No.: US 10,656,461 B2
(45) Date of Patent: May 19, 2020

(54) DISPLAY SUBSTRATE, DISPLAY PANEL AND DISPLAY APPARATUS

(71) Applicant: Wuhan China Star Optoelectronics Semiconductor Display Technology Co., Ltd., Wuhan (CN)

(72) Inventor: Xuanyun Wang, Shenzhen (CN)

(73) Assignee: WUHAN CHINA STAR OPTOELECTRONICS SEMICONDUCTOR DISPLAY TECHNOLOGY CO., LTD., Wuhan (CN)

(*) Notice: Subject to any disclaimer, the term of this patent is extended or adjusted under 35 U.S.C. 154(b) by 8 days.

(21) Appl. No.: 15/740,588

(22) PCT Filed: Nov. 23, 2017

(86) PCT No.: PCT/CN2017/112610
§ 371 (c)(1),
(2) Date: Aug. 27, 2018

(87) PCT Pub. No.: WO2019/090844
PCT Pub. Date: May 16, 2019

(65) Prior Publication Data
US 2019/0146272 A1  May 16, 2019

(30) Foreign Application Priority Data
Nov. 13, 2017 (CN) .......................... 2017 1 1121714

(51) Int. Cl.
*G02F 1/1335* (2006.01)
*G02F 1/13363* (2006.01)
(Continued)

(52) U.S. Cl.
CPC .... *G02F 1/133555* (2013.01); *G02F 1/13363* (2013.01); *G02F 1/133528* (2013.01);
(Continued)

(58) Field of Classification Search
CPC ......... G02F 1/133555; G02F 1/133528; G02F 1/13362; G02F 1/13363; G02F 2202/40;
(Continued)

(56) References Cited

U.S. PATENT DOCUMENTS 4,398,805 A   8/1983 Cole
7,327,421 B2* 2/2008 Kaneko ............. G02F 1/133555
                                            349/114

(Continued)

FOREIGN PATENT DOCUMENTS

| CN | 1971347 A | 5/2007 |
| CN | 101339344 A | 1/2009 |
| KR | 1020150004050 A | 1/2015 |

*Primary Examiner* — Jia X Pan
(74) *Attorney, Agent, or Firm* — Brinks Gilson & Lione

(57) ABSTRACT

The present disclosure discloses a display substrate, a display panel and a display apparatus. The display substrate includes: a first substrate and light emitting structures. The first substrate is divided into a plurality of reflection zones and transmission zones alternatively defined. The light emitting structures are arranged on a first surface of the first substrate and corresponding to the transmission zones. The light emitting structures arranged on the first surface of the first substrate may provide a light source for the transmission zones such that the backlight may be omitted. Therefore, the thickness of the transflective crystal liquid display apparatus may be reduced. The liquid crystal display apparatus may be thinner. The power consumption may be also reduced and the durability may be improved.

17 Claims, 3 Drawing Sheets

(51) Int. Cl.
*H01L 27/32* (2006.01)
*G02F 1/13357* (2006.01)

(52) U.S. Cl.
CPC ........ *G02F 1/133605* (2013.01); *H01L 27/32* (2013.01); *G02F 2001/133538* (2013.01); *G02F 2001/133631* (2013.01); *G02F 2001/133638* (2013.01)

(58) Field of Classification Search
CPC ... G02F 2001/133638; G02F 1/133605; G02F 2001/133548; G02F 2001/133631; G02F 2001/133538; G02B 5/3033; G02B 5/3025; G02B 27/26; G02B 5/3083; G02B 5/3058; Y10T 428/1041; H01L 27/32
See application file for complete search history.

(56) References Cited

U.S. PATENT DOCUMENTS

| | | | |
|---|---|---|---|
| 2002/0145689 A1* | 10/2002 | Kaneko | G02F 1/133555 349/114 |
| 2003/0081161 A1 | 5/2003 | Ozawa | |
| 2013/0194528 A1 | 8/2013 | Wang et al. | |
| 2017/0199428 A1* | 7/2017 | Lin | G02F 1/133555 |
| 2018/0180953 A1* | 6/2018 | Li | G02F 1/13439 |

* cited by examiner

DISPLAY SUBSTRATE, DISPLAY PANEL AND DISPLAY APPARATUS

CROSS-REFERENCE TO RELATED APPLICATIONS

The present application is a 35 U.S.C. § 371 National Phase conversion of International (PCT) Patent Application No. PCT/CN2017/112610, filed on Nov. 23, 2017, which claims foreign priority to Chinese Patent Application No. 201711121714.8, filed on Nov. 13, 2017 in the State Intellectual Property Office of China, the entire contents of which are hereby incorporated by reference.

TECHNICAL FIELD

The present disclosure generally relates to the display field, and in particular to a display substrate, a display panel and a display apparatus.

BACKGROUND

The liquid crystal display (LCD) apparatus has now become the mainstream display apparatus. A light source is necessary for displaying images since the liquid crystal molecule itself does not emit light. A liquid crystal apparatus may be reflective, transmissive or transflective based on the type of its light source. A transitive LCD mainly uses a backlight as its light source and a transparent electrode as its transmission zone where light may pass for displaying images. A reflective LCD mainly uses a front light or an external environmental light as its light source and a reflective electrode as its reflection zone where light may be reflected for displaying images. A transflective LCD is a combination of a transitive LCD and a reflective LCD, on which the reflective zone and the transmission zone are both arranged such that the backlight and the front light (or the external environmental light) may be utilized simultaneously for displaying images.

The transflective LCD apparatus has the advantages of both the transitive LCD and the reflective LCD apparatus, for example, it may shows a bright image in a dark environment or it may save power when the light source is enough. However, since the transflective LCD apparatus includes the structures of both the transitive LCD and the reflective LCD apparatus (a backlight and a reflective layer are both necessary for the transflective LCD apparatus), the transflective LCD apparatus is usually thick. Furthermore, a portion of light emitted by the backlight corresponding to the reflection zone may be blocked and wasted such that the power consumption of the transflective LCD apparatus may be augmented.

SUMMARY

The present disclosure provides a display substrate to solve the problems of high thickness and high power consumption of the transflective LCD apparatus.

To solve the above-mentioned problem, a technical scheme adopted by the present disclosure is to provide a display substrate including a first substrate divided into a plurality of reflection zones and transmission zones alternatively defined, and light emitting structures arranged on a first surface of the first substrate and located corresponding to the transmission zones.

To solve the above-mentioned problem, another technical scheme adopted by the present disclosure is to provide a display panel including the above-mentioned display substrate, a second substrate arranged opposite the display substrate and a liquid crystal layer set between the display substrate and the second substrate.

To solve the above-mentioned problem, another technical scheme adopted by the present disclosure is to provide a display apparatus including the above-mentioned display panel.

The light emitting structures arranged on the first surface of the first substrate may provide a light source for the transmission zones such that the backlight may be omitted. Therefore, the thickness of the transflective crystal liquid display apparatus may be reduced. The liquid crystal display apparatus may be thinner. The power consumption may be also reduced and the durability may be improved.

BRIEF DESCRIPTION OF THE DRAWINGS

To describe the technical solutions in the embodiments of the present disclosure more clearly, the accompanying drawings required for describing the embodiments will now be briefly introduce as follows. Apparently, the accompanying drawings in the following description show merely some embodiments of the present disclosure. For those skilled in the art, other drawings can also be obtained according to these drawings without any creative efforts.

DETAILED DESCRIPTION

The disclosure will now be described in detail with reference to the accompanying drawings and examples. Apparently, the embodiments described are merely a portion but not all of the embodiments of the present disclosure. Embodiments obtained by those skilled in the art based on the embodiments of the present disclosure without creative efforts should all belong to the protection scope of the present disclosure.

Figure 1:
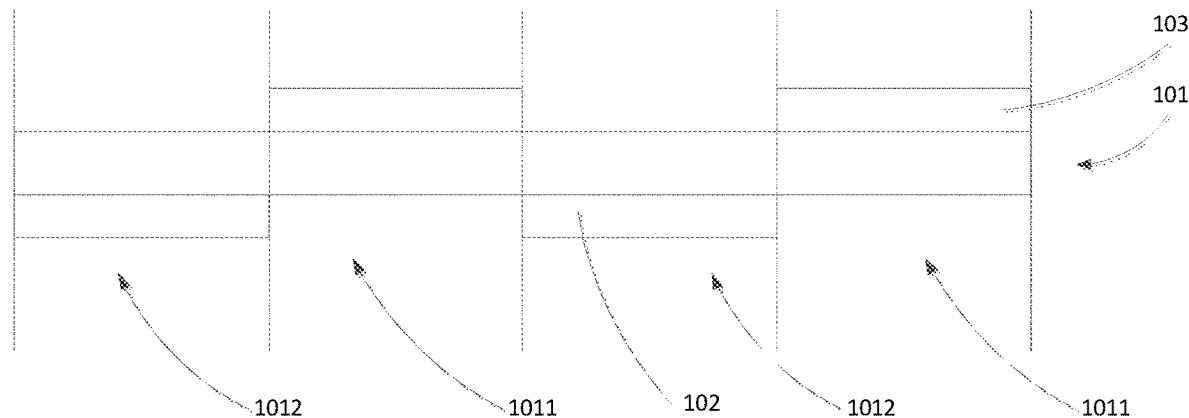
FIG. 1 is a schematic diagram of a display substrate according to an embodiment of the present disclosure.

Please refer to FIG. 1. According to an embodiment of the present disclosure, the display substrate of the present disclosure may include a first substrate 101, light emitting structures 102 and polarizing filters 103. The first substrate 101 may be divided in to several reflection zones 1011 and transmission zones 1012 alternatively defined. The light emitting structures 102 may be arranged on a first surface of the first substrate 101 and located corresponding to the transmission zones 1012. The polarizing filters 103 may be arranged on a second surface of the first substrate 101 and located corresponding to the reflection zones 1011.

More specifically, when the external environmental light intensity is low, the light emitting structures 102 at the transmission zones 1012 may work as the light source for emitting light instead of the backlight of original design. When the external environmental light intensity is high, the light emitting structures 102 do not emit light while the external light may be reflected at the reflection zones 1011 and pass through the polarizing filters 103 so as to provide the light source for displaying images.

In one embodiment, when the external environmental light intensity is low, the light emitting structures 102 may be taken as one portion of the light source and the external environmental light may be taken as the other portion of the light source. When the external environmental light intensity is high, the light emitting structures 102 may also be taken as one portion of the light source and the external environmental light may also be taken as the other portion of the light source.

The light emitting structures 102 may include organic light emitting diodes.

The light emitting structures arranged on the first surface of the first substrate may provide a light source for the transmission zones such that the backlight may be omitted. Therefore, the thickness of the transflective crystal liquid apparatus may be reduced. The liquid crystal display apparatus may be thinner. The power consumption may be also reduced and the durability may be improved.

Figure 2:
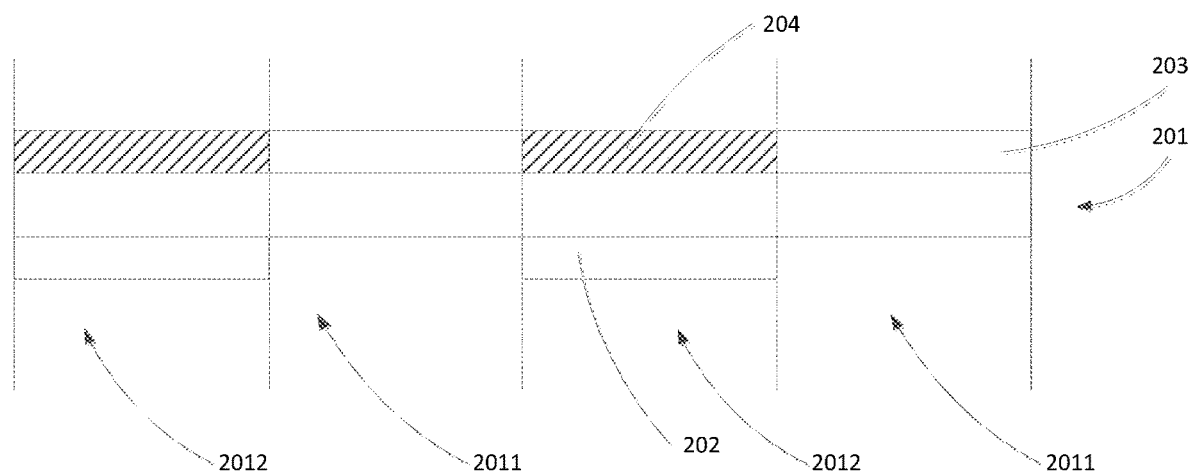
FIG. 2 is a schematic diagram of a display substrate according to another embodiment of the present disclosure.

Please refer to FIG. 2. According to another embodiment, the display substrate of the present disclosure may include a first substrate 201, light emitting structures 202, polarizing filters 203 and quarter-wave plates 204. The first substrate 201 may be divided into several reflection zones 2011 and transmission zones 2012 alternatively defined. The light emitting structures 202 may be arranged on a first surface of the first substrate 201 and located corresponding to the transmission zones 2012. The polarizing filters 203 may be arranged on a second surface of the first substrate 201 and located corresponding to the reflection zones 2011. The quarter-wave plates 204 may be arranged on the same side of the first substrate 201 as the polarizing filters 203 and located corresponding to the transmission zones 2012.

In this embodiment, by applying the quarter-wave plates 204, the reflection of the external environmental light by the display substrate may be reduced such that the display quality of the transmission zones 2012 may be improved.

The light emitting structures arranged on the first surface of the first substrate may provide a light source for the transmission zones such that the backlight may be omitted. Therefore, the thickness of the transflective crystal liquid display apparatus may be reduced. The liquid crystal display apparatus may be thinner. The power consumption may be also reduced and the durability may be improved. By depositing the quarter-wave plates on the second surface of the first substrate, the reflection of the external environmental light by the display substrate may be reduced such that the display quality of the transmission zones may be improved.

Figure 3:
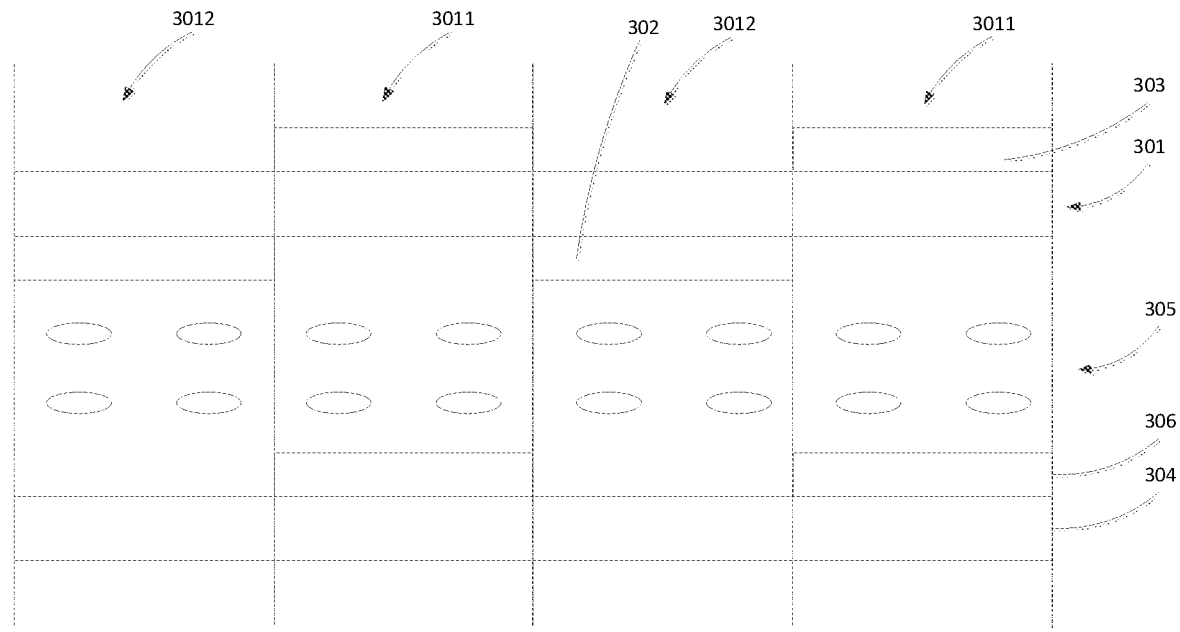
FIG. 3 is a schematic diagram of a display panel according to an embodiment of the present disclosure.

Please refer to FIG. 3. According to an embodiment, the display panel of the present disclosure may include a display substrate, a second substrate 304 arranged opposite the display substrate and a liquid crystal layer 305 set between the display substrate and the second substrate 304.

The display substrate may include a first substrate 301, light emitting structures 302 and polarizing filters 303. The first substrate 301 may be divided into several reflection zones 3011 and transmission zones 3012 alternatively defined. The light emitting structures 302 may be arranged on a first surface of the first substrate 301 and located corresponding to the transmission zones 3012. The polarizing filters 303 may be arranged on a second surface of the first substrate 301 and located corresponding to the reflection zones 3011.

In one embodiment, the second substrate 304 may include reflectors 306 arranged on a side facing the display substrate. The reflectors 306 may be located corresponding to the reflection zones 3011.

In this embodiment, the reflectors 306 may be metal structures.

More specifically, when the external environmental light intensity is higher than a threshold value, the light emitting structures 302 do not emit light while the reflectors 306 reflect light from the external light source to provide a light source for the display panel. When the external environmental light intensity is lower than the threshold value, the light emitting structures 302 emit light to provide the light source for the display panel.

In one embodiment, the threshold value may be predetermined or dynamically changed according to different environments.

In the case of the transflective LCD apparatus of related art, a portion of light emitted by the backlight is blocked by the reflectors and another portion is attenuated when passing through the liquid crystal layer. In contrast, in this embodiment, the light emitting structures 302 may be located correspond to the transmission zones 3012 such that the light emitted by the light emitting structures 302 will not be blocked by the reflectors 306 and will not pass the liquid crystal layer 305 either. Therefore, light energy waste can be reduced.

In other embodiments, the liquid crystal layer 305 may be located merely in the reflection zones 3011 and not in the transmission zones 2012 to save liquid crystal.

The light emitting structures arranged on the first surface of the first substrate may provide a light source for the transmission zones such that the backlight may be omitted. Therefore, the thickness of the transflective crystal liquid display apparatus may be reduced. The liquid crystal display apparatus may be thinner. The power consumption may be also reduced and the durability may be improved.

Figure 4:
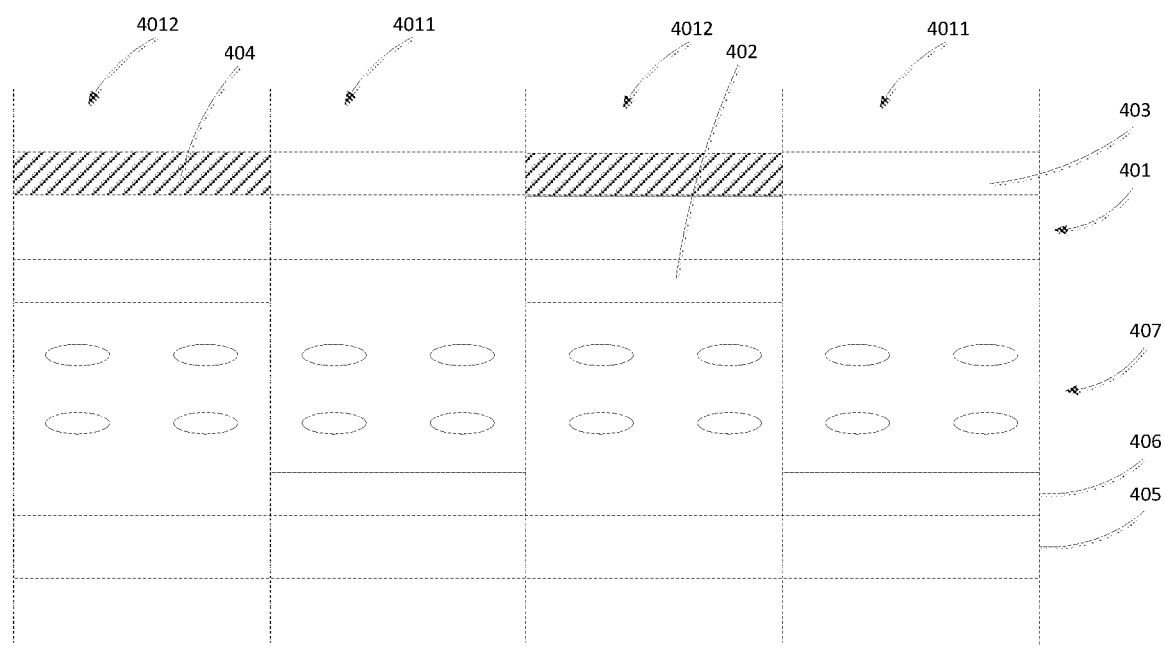
FIG. 4 is a schematic diagram of a display panel according to another embodiment of the present disclosure.

Please refer to FIG. 4. According to another embodiment, the display panel of the present disclosure may include display substrate, a second substrate 404 arranged opposite the display substrate and a liquid crystal layer 405 set between the display substrate and the second substrate 404.

The display substrate may include a first substrate 401, light emitting structures 402, polarizing filters 403 and quarter-wave plates 404. The first substrate 401 may be divided into several reflection zones 4011 and transmission zones 4012 alternatively defined. The light emitting structures 402 may be arranged on a first surface of the first substrate 401 and located corresponding to the transmission zones 4012. The polarizing filters 403 may be arranged on a second surface of the first substrate 401 and located corresponding to the reflection zones 4011. The quarter-wave plates 404 may be arranged at a same side of the first substrate 401 as the polarizing filters 403 and located corresponding to the transmission zones 4012.

The light emitting structures arranged on the first surface of the first substrate may provide a light source for the transmission zones such that the backlight may be omitted. Therefore, the thickness of the transflective crystal liquid display apparatus may be reduced. The liquid crystal display apparatus may be thinner. The power consumption may be also reduced and the durability may be improved. By depositing the quarter-wave plates on the second surface of the first substrate, the reflection of the external environmental light by the display substrate may be reduced such that the display quality of the transmission zones may be improved.

Figure 5:
FIG. 5 is a schematic diagram of a display apparatus according to an embodiment of the present disclosure.

Please refer to FIG. 5. According to an embodiment, the display apparatus 50 of the present disclosure may include the display panel 501 as set forth. Detailed description of the display panel 501 has been described in the above-mentioned embodiments and will not be described hereon.

The light emitting structures arranged on the first surface of the first substrate may provide a light source for the transmission zones such that the backlight may be omitted. Therefore, the thickness of the transflective crystal liquid display apparatus may be reduced. The liquid crystal display apparatus may be thinner. The power consumption may be also reduced and the durability may be improved.

The foregoing is merely embodiments of the present disclosure, and is not intended to limit the scope of the disclosure. Any transformation of equivalent structure or equivalent process which uses the specification and the accompanying drawings of the present disclosure, or directly or indirectly application in other related technical fields, are likewise included within the scope of the protection of the present disclosure.

What is claimed is:

1. A display apparatus comprising:
a display panel comprising a display substrate, a second substrate arranged opposite to the display substrate and a liquid crystal layer set between the display substrate and the second substrate, wherein the display substrate comprises:
a first substrate divided into a plurality of reflection zones and transmission zones alternatively defined;
polarizing filters arranged on and contacted with a second surface of the first substrate and spaced from each other;
quarter-wave plates arranged on and contacted with the second surface of the first substrate and spaced from each other, wherein the polarizing filters and the quarter-wave plates are arranged on the second surface in an alternating manner such that each of the polarizing filters is located corresponding to a different reflection zone and each of the quarter-wave plates is located corresponding to a different transmission zone, the quarter-wave plates and the polarizing filters are non-overlapping in a plan view; and
light emitting structures arranged on a first surface of the first substrate and located corresponding to the transmission zones.

2. The display apparatus of claim 1, wherein the light emitting structures are organic light emitting diodes.

3. The display apparatus of claim 1, wherein the second substrate comprises reflectors arranged on a side facing the display substrate.

4. The display apparatus of claim 3, wherein the reflectors are located corresponding to the reflection zones.

5. The display apparatus of claim 3, wherein the reflectors are metal structures.

6. The display apparatus of claim 3, wherein
when a light intensity of an external lighting source is higher than a threshold value, the light emitting structures do not emit light and the reflectors reflect light from the external lighting source to provide a first lighting source for the display panel;
when the light intensity of the external lighting source is lower than the threshold value, the light emitting structures emit light to provide a second lighting source for the display panel.

7. The display apparatus of claim 6, wherein
the threshold value is predetermined or dynamically changed according to different environments.

8. The display apparatus of claim 1, wherein the liquid crystal layer comprises a plurality of first liquid crystal portions and a plurality of second liquid crystal portions, each of the first liquid crystal portions is located corresponding to a reflection zone, each of the second liquid crystal portions is located corresponding to a transmission zone;
each of the light emitting structures is sandwiched between a corresponding second liquid crystal portion and a corresponding transmission zone, each of the light emitting structures comprises a first side and a second side opposite to each other, the first side is contacted with the corresponding second liquid crystal portion, the second side is contacted with the corresponding transmission zone.

9. A display substrate, comprising:
a first substrate divided into a plurality of reflection zones and transmission zones alternatively defined;
polarizing filters arranged on and contacted with a second surface of the first substrate and spaced from each other;
quarter-wave plates arranged on and contacted with the second surface of the first substrate and spaced from each other, wherein the polarizing filters and the quarter-wave plates are arranged on the second surface in an alternating manner such that each of the polarizing filters is located corresponding to a different reflection zone and each of the quarter-wave plates is located corresponding to a different transmission zone, the quarter-wave plates and the polarizing filters are non-overlapping in a plan view; and
light emitting structures arranged on a first surface of the first substrate and located corresponding to the transmission zones.

10. The display substrate of claim 9, wherein the light emitting structures are organic light emitting diodes.

11. The display substrate of claim 9, wherein the light emitting structures are contacted with the first surface of the first substrate.

12. A display panel, comprising a display substrate, a second substrate arranged opposite to the display substrate and a liquid crystal layer set between the display substrate and the second substrate, wherein the display substrate comprises:
a first substrate divided into a plurality of reflection zones and transmission zones alternatively defined;
polarizing filters arranged on and contacted with a second surface of the first substrate and spaced from each other;
quarter-wave plates arranged on and contacted with the second surface of the first substrate and spaced from each other, wherein the polarizing filters and the quarter-wave plates are arranged on the second surface in an alternating manner such that each of the polarizing filters is located corresponding to a different reflection zone and each of the quarter-wave plates is located corresponding to a different transmission zone, the quarter-wave plates and the polarizing filters are non-overlapping in a plan view; and
light emitting structures arranged on a first surface of the first substrate and located corresponding to the transmission zones.

13. The display panel of claim 12, wherein the second substrate comprises reflectors arranged on a side facing the display substrate.

14. The display panel of claim 13, wherein the reflectors are located corresponding to the reflection zones.

15. The display panel of claim 13, wherein the reflectors are metal structures.

16. The display panel of claim 13, wherein
when a light intensity of an external lighting source is higher than a threshold value, the light emitting structures do not emit light and the reflectors reflect light from the external lighting source to provide a first lighting source for the display panel;
when the light intensity of the external lighting source is lower than the threshold value, the light emitting structures emit light to provide a second lighting source for the display panel.

17. The display panel of claim 12, wherein the liquid crystal layer comprises a plurality of first liquid crystal portions and a plurality of second liquid crystal portions, each of the first liquid crystal portions is located corresponding to a reflection zone, each of the second liquid crystal portions is located corresponding to a transmission zone;
each of the light emitting structures is sandwiched between a corresponding second liquid crystal portion and a corresponding transmission zone, each of the light emitting structures comprises a first side and a second side opposite to each other, the first side is contacted with the corresponding second liquid crystal portion, the second side is contacted with the corresponding transmission zone.

* * * * *